(12) United States Patent
Niimura

(10) Patent No.: US 7,898,552 B2
(45) Date of Patent: Mar. 1, 2011

(54) METHOD AND EDITING PROCESSOR FOR ADDING GRAPHICS OBJECT WITH SIMPLE MANNER

(75) Inventor: Kenji Niimura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 895 days.

(21) Appl. No.: 11/879,587

(22) Filed: Jul. 17, 2007

(65) Prior Publication Data

US 2008/0024521 A1      Jan. 31, 2008

(30) Foreign Application Priority Data

Jul. 18, 2006   (JP) ............................. 2006-195355

(51) Int. Cl.
   *G09G 5/14* (2006.01)
(52) U.S. Cl. ...................... 345/619; 345/613
(58) Field of Classification Search ............... 345/619, 345/613
   See application file for complete search history.

(56) References Cited

U.S. PATENT DOCUMENTS

| | | | | |
|---|---|---|---|---|
| 5,263,165 A * | 11/1993 | Janis | ............ | 711/163 |
| 5,347,578 A * | 9/1994 | Duxbury | ............ | 707/781 |
| 5,696,898 A * | 12/1997 | Baker et al. | ............ | 726/12 |
| 7,047,318 B1 * | 5/2006 | Svedloff | ............ | 709/246 |
| 2002/0002561 A1 * | 1/2002 | Higashiura et al. | ............ | 707/204 |
| 2004/0221234 A1 * | 11/2004 | Imai | ............ | 715/531 |
| 2007/0022290 A1 * | 1/2007 | Itoh | ............ | 713/168 |
| 2007/0266062 A1 * | 11/2007 | Young | ............ | 707/204 |
| 2008/0024521 A1 * | 1/2008 | Niimura | ............ | 345/619 |
| 2008/0140388 A1 * | 6/2008 | Niimura | ............ | 704/9 |
| 2008/0250075 A1 * | 10/2008 | Imai | ............ | 707/200 |

FOREIGN PATENT DOCUMENTS

| | | |
|---|---|---|
| JP | 2003-084940 | 3/2003 |
| JP | 2004-348428 | 12/2004 |
| WO | WO 98/50853 A | 11/1998 |

OTHER PUBLICATIONS

European Search Report EP 07 25 2843, dated Jan. 1, 2008 (6 pages).
Revankar S. et al., "Picture, graphics, and text classification of document image regions," Proceedings of the SPIE, SPIE, Bellingham, VA, US; vol. 4300, 2001, pp. 224-228, XP002284871.

* cited by examiner

*Primary Examiner*—Javid A Amini
(74) *Attorney, Agent, or Firm*—Blakely, Sokoloff, Taylor & Zafman LLP

(57) ABSTRACT

An editing processor includes a storage unit to store a document file that includes an object group in which objects are arranged according to an implementation order at each page of an electric document, a reading unit to read the object group from the storage unit in response to a read request for a target page of the electric document, an encapsulation processing unit to encapsulate a graphics object in the object group in response to an information input of the graphics to be added, and an editing unit to generate a graphics object from the information of the graphics and to add the generated graphics object to a position following the end of the object group arranged according to the implementation order in response to the encapsulation of the graphics object.

8 Claims, 19 Drawing Sheets

FIG. 3A

```
30obj
<</Type /Page....
  /Contents [40R50R]
>>
endobj
```

```
40obj
<< ... >>
stream
```

[ CHANGE GRAPHICS STATE COMMAND 1 ]

COMMAND TO DRAW GRAPHICS OBJECT 1
  AT A BACK SIDE OF EXISTING OBJECT
  USING GRAPHICS OPERATOR

[ CHANGE GRAPHICS STATE COMMAND 2 ]

```
endstream
endobj
```

```
50obj
<< ... >>
stream
```

COMMAND TO DRAW GRAPHICS OBJECT 2
  AT A BACK SIDE OF EXISTING OBJECT
  USING GRAPHICS OPERATOR

[ CHANGE GRAPHICS STATE COMMAND 3 ]

COMMAND TO DRAW GRAPHICOJECT 3
  AT A BACK SIDE OF EXISTING OBJECT
  USING GRAPHICS OPERATOR

```
endobj
```

FIG. 3B

CHANGE GRAPHICS STATE COMMAND 1

COMMAND TO DRAW GRAPHICS OBJECT 1 AT A BACK SIDE OF EXISTING OBJECT USING GRAPHICS OPERATOR

CHANGE GRAPHICS STATE COMMAND 2

COMMAND TO DRAW GRAPHICS OBJECT 2 AT A BACK SIDE OF EXISTING OBJECT USING GRAPHICS OPERATOR

CHANGE GRAPHICS STATE COMMAND 3

COMMAND TO DRAW GRAPHICS OBJECT 3 AT A BACK SIDE OF EXISTING OBJECT USING GRAPHICS OPERATOR

FIG. 6A

```
30obj
<</Type /Page ....
  /Contents [40R50R60R]
>>
endobj
```

```
40obj
<< ... >>
stream
```
  CHANGE GRAPHICS STATE COMMAND 1

COMMAND TO DRAW GRAPHICS OBJECT 1
  AT A BACK SIDE OF EXISTING OBJECT
  USING GRAPHICS OPERATOR

CHANGE GRAPHICS STATE COMMAND 2

```
endstream
endobj
```

```
50obj
<< ... >>
stream
```
  COMMAND TO DRAW GRAPHICS OBJECT 2
  AT A BACK SIDE OF EXISTING OBJECT
  USING GRAPHICS OPERATOR

CHANGE GRAPHICS STATE COMMAND 3

COMMAND TO DRAW GRAPHICS OBJECT 3
  AT A BACK SIDE OF EXISTING OBJECT
  USING GRAPHICS OPERATOR

```
endobj
```

```
60obj
<< ... >>
stream
```
  CHANGE GRAPHICS STATE COMMAND 4

COMMAND TO DRAW GRAPHICS OBJECT 4
  AT A BACK SIDE OF EXISTING OBJECT
  USING GRAPHICS OPERATOR

```
endstream
endobj
```

FIG. 6B

CHANGE GRAPHICS STATE COMMAND 1

COMMAND TO DRAW GRAPHICS OBJECT 1 AT A BACK SIDE OF EXISTING OBJECT USING GRAPHICS OPERATOR

CHANGE GRAPHICS STATE COMMAND 2

COMMAND TO DRAW GRAPHICS OBJECT 2 AT A BACK SIDE OF EXISTING OBJECT USING GRAPHICS OPERATOR

CHANGE GRAPHICS STATE COMMAND 3

COMMAND TO DRAW GRAPHICS OBJECT 3 AT A BACK SIDE OF EXISTING OBJECT USING GRAPHICS OPERATOR

CHANGE GRAPHICS STATE COMMAND 4

COMMAND TO DRAW GRAPHICS OBJECT 4 AT A BACK SIDE OF EXISTING OBJECT USING GRAPHICS OPERATOR

FIG. 9A

```
30obj
<</Type /Page ....
  /Contents [70R40R50R80R60R]
>>
endobj
```

```
40obj
<< ... >>
stream
```
CHANGE GRAPHICS STATE COMMAND 1

COMMAND TO DRAW GRAPHICS OBJECT 1
AT A BACK SIDE OF EXISTING OBJECT
USING GRAPHICS OPERATOR

CHANGE GRAPHICS STATE COMMAND 2
```
endstream
endobj
```

```
50obj
<< ... >>
stream
```
COMMAND TO DRAW GRAPHICS OBJECT 2
AT A BACK SIDE OF EXISTING OBJECT
USING GRAPHICS OPERATOR

CHANGE GRAPHICS STATE COMMAND 3

COMMAND TO DRAW GRAPHICS OBJECT 3
AT A BACK SIDE OF EXISTING OBJECT
USING GRAPHICS OPERATOR
```
endobj
```

```
60obj
<< ... >>
stream
```
CHANGE GRAPHICS STATE COMMAND 4

COMMAND TO DRAW GRAPHICS OBJECT 4
AT A BACK SIDE OF EXISTING OBJECT
USING GRAPHICS OPERATOR
```
endstream
endobj
```

```
70obj
<</Length 1>>stream
q
endstream
endobj
```

```
80obj
<</Length 1>>stream
Q
endstream
endobj
```

FIG. 9B q

CHANGE GRAPHICS STATE COMMAND 1

COMMAND TO DRAW GRAPHICS OBJECT 1 AT A BACK SIDE OF EXISTING OBJECT USING GRAPHICS OPERATOR

CHANGE GRAPHICS STATE COMMAND 2

COMMAND TO DRAW GRAPHICS OBJECT 2 AT A BACK SIDE OF EXISTING OBJECT USING GRAPHICS OPERATOR

CHANGE GRAPHICS STATE COMMAND 3

COMMAND TO DRAW GRAPHICS OBJECT 3 AT A BACK SIDE OF EXISTING OBJECT USING GRAPHICS OPERATOR

Q

CHANGE GRAPHICS STATE COMMAND 4

COMMAND TO DRAW GRAPHICS OBJECT 4 AT A BACK SIDE OF EXISTING OBJECT USING GRAPHICS OPERATOR

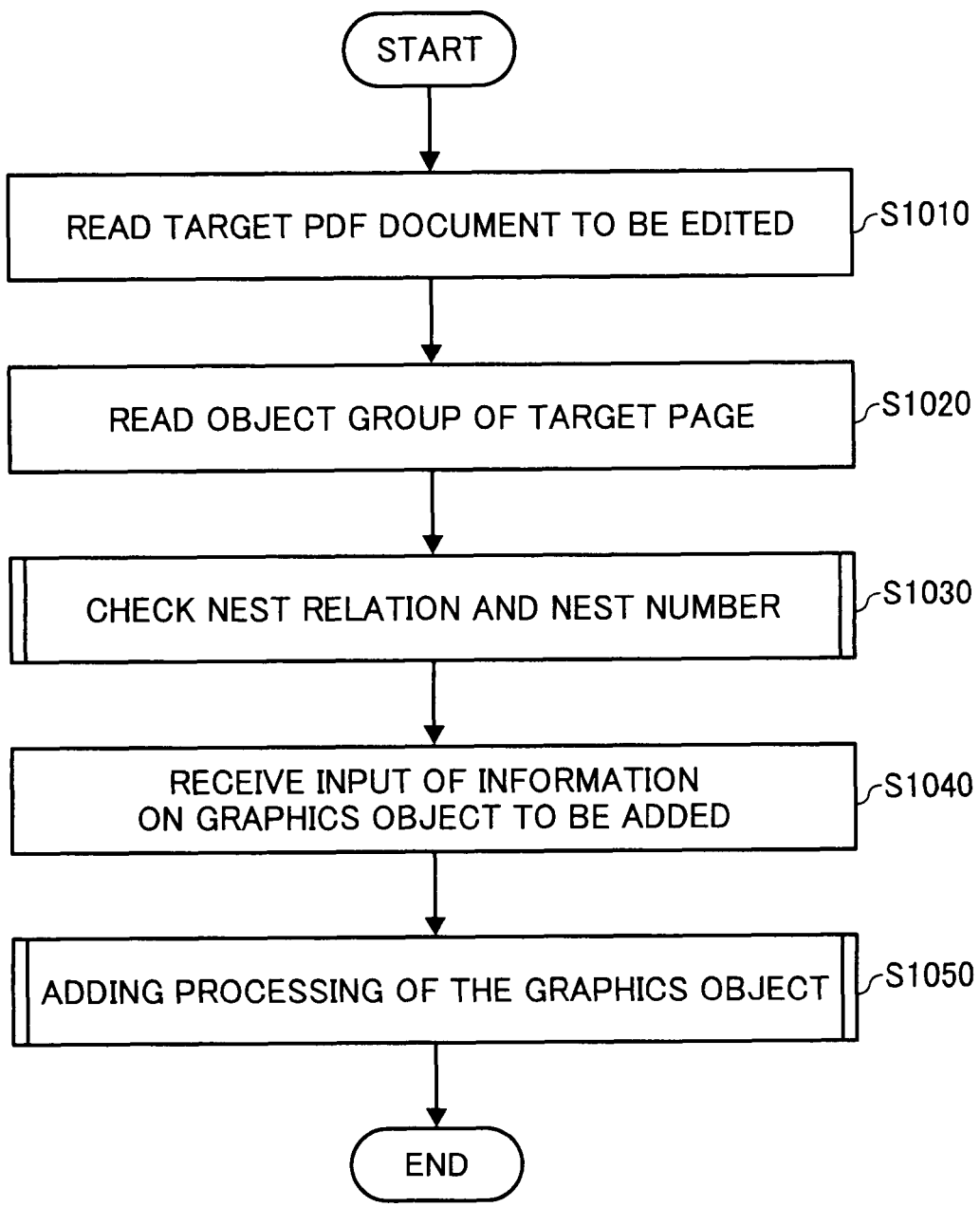

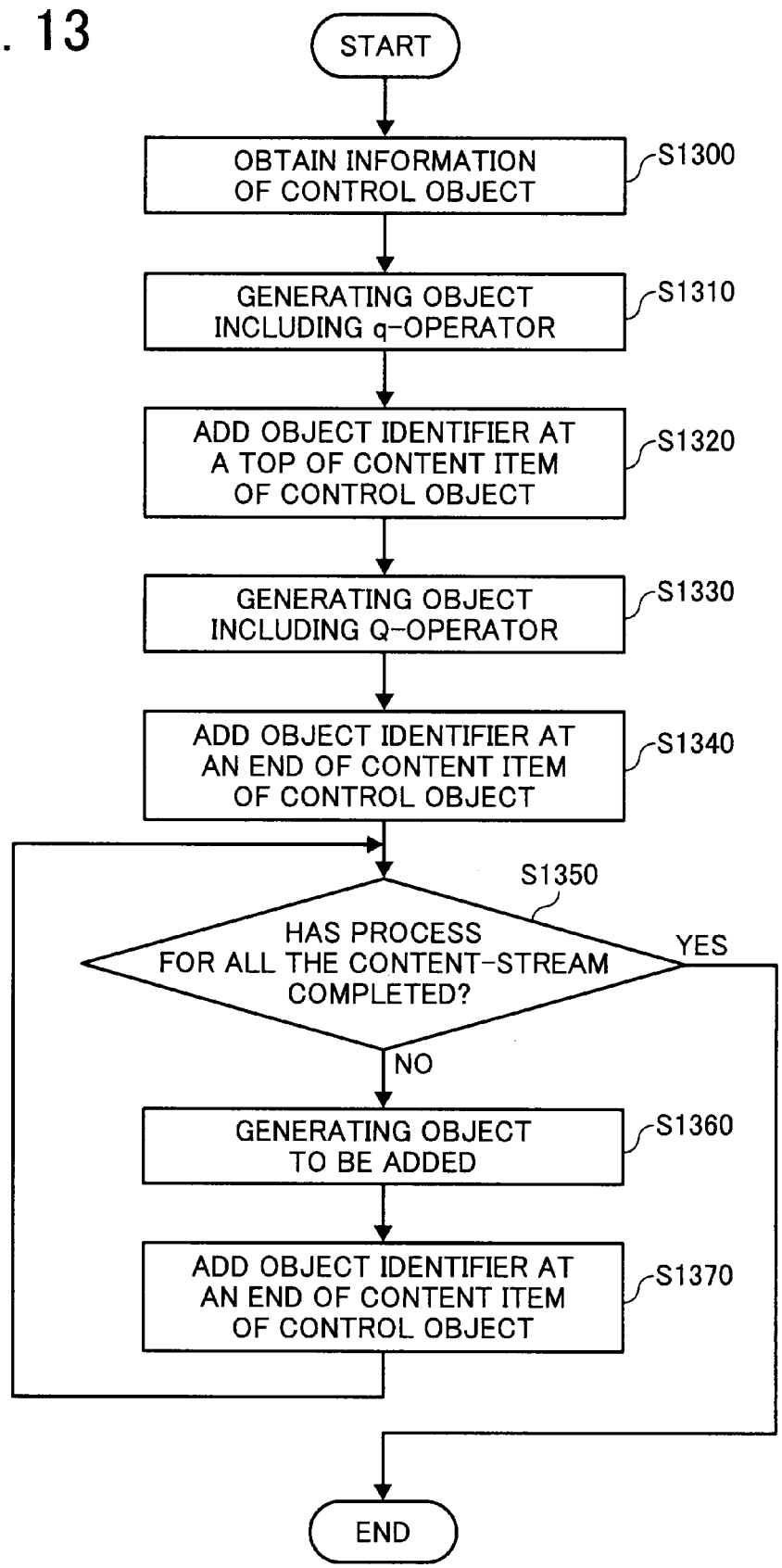

METHOD AND EDITING PROCESSOR FOR ADDING GRAPHICS OBJECT WITH SIMPLE MANNER

PRIORITY

The present application claims priority to and incorporates by reference the entire contents of Japanese patent application, No. 2006-195355, filed in the Japan on Jul. 18, 2006.

BACKGROUND OF THE INVENTION

1. Field of the Invention

The present invention describes a method and processor for editing electronic document, and more particularly a method and editing processor for adding graphics object with simple manner.

2. Discussion of the Background

Recently, a pdf (portable document format) format is widely used as a common document-exchanging format because it can read and print documents on different platforms and among different versions of an application software. A document created with the pdf format includes a character part and a graphics part that indicates figure, etc. The character part makes it possible to search for a character and to reuse the searched character in other application software.

More specifically, a pdf file 100 includes four parts, i.e., a file header 110, a file body 120, a cross-reference table 130, and a file trailer 140 referring to FIG. 1. The file header 110 is provided in a leading portion of the pdf file 100 and defines information of data itself as header information. The file header 110 includes, for example, date on document creation, creator's name, etc. at a predetermined area reserved at each page. The file body 120 defines Contents of the pdf document. Data included in the file body 120 is defined to have objects in array form.

The cross-reference table 130 describes a position of each object in list form in order to make random access possible. The file trailer 140 is a footer that represents the end of the file. The file header 110, the file body 120, the cross-reference table 130, and the file trailer 140 comprise a data set. The data set is repeated.

Referring to a description image of FIG. 2, the file body 120 of the pdf file 100 is now described in detail. As described above, the file body 120 is defined by an array of the objects ($X_{obj}$-end$_{obj}$). X is an identifier ID to identify the object and is a numeral, character, symbol, or a combination of these. In the embodiment of FIG. 2, numerals 30, 40, and 50 are used as identifiers. Each object 200, 210, and 220 can refer to other objects using this identifier ID.

In the embodiment of FIG. 2, the object 200 having the identifier ID 30 includes items with format of [40R] and [50R] as Contents items (Contents). [40R] and [50R] refer object identifiers 40 and 50, respectively.

Referring to FIG. 3, process steps to define the file body 120 with draw graphics command and to draw the graphics are described. FIGS. 3A, 3B, and 3C illustrate description image, merged object image, and drawing image, respectively.

One of the objects in the file body 120 manages information on a page of the pdf file 100. In this embodiment, the object [$30_{obj}$] manages the information on a page of the pdf file 100. Further, a draw Contents item in the object [$30_{obj}$] manages drawing information of the page. The draw Contents item designates [$40_{obj}$] or [$50_{obj}$] that is called Content-stream. Each Content-stream includes command lines, such as a draw graphics object command to draw graphics object and a change graphics state command to change state of the graphics object. These commands may be compressed.

To draw the image shown in FIG. 3C, the Content-streams described in the Contents item of [$30_{obj}$] in FIG. 3A are merged sequentially. The Content-stream as shown in FIG. 3B is generated. Using a browsing software such as Viewer, commands are read and interpreted from a top of the merged Content-stream. Drawing procedure is then fixed and the image is drawn.

There are two main commands with respect to the commands of the Content-stream, i.e., a draw graphics object command and a change graphics state command. The draw graphics object commands are a command to draw graphics object 1 at a backside of an existing object using graphics operator, a command to draw graphics object 2 at a backside of the existing object using graphics operator, and a command to draw graphics object 3 at a backside of the existing object using graphics operator as shown in FIGS. 3A and 3B. As these commands are interpreted sequentially, the graphics objects are drawn sequentially in the same order. When the graphics object is drawn, it is performed in order to draw the object in accordance with a definition that determines whether to draw the graphics object at a front side of the existing object, or at a back side of the existing object.

The change graphics state command is a command to perform information change of color, axis and so on. This command is maintained until the Contents is revised, or the command being implemented leaves an effective region (scope) of the change graphics state command.

When the scope of the change graphic state is not included in the merged Content-Stream, the draw graphic object command may not be affected by a change graphic state command 3 that is implemented at an immediately preceding step, but may be affected by an instruction to change graphics state commands 1 and 2. For example, when there is no instruction to change an axis system by the change graphic state command 1, graphics is drawn with an axis defined by the change graphics state command 1 at the implementation of the draw graphics object command.

The scope is now described in detail. When the graphics state is changed, the state condition is maintained from a time the state condition is changed to an end time of the Content-stream. For example, the scope of the change graphics state command 1 that changes graphics object during the Content-stream in FIG. 4 is maintained from a time the Content-stream is changed to an end time of the Content-stream. Similarly, the scope of the change graphics state command 2 that changes graphics object is maintained from a time the Content-stream is changed to an end time of the Content-stream. For this reason, both drawing commands 2 and 3 are implemented under the effect of the graphics state defined by the change graphics state command 1.

In the pdf format, two types of operators that are q-operator and Q-operator are provided to localize the scope that is the effective region for changing graphics state. As for the graphics state around the region framed by the q-operator and the Q-operator corresponding to the q-operator, the graphics state is invalid in a region after the Q-operator and is returned to the graphics state before the q-operator. These q-operator and Q-operator can be consolidated in a nested block (a plurality of commands can be wrapped up as a unit.) A number of the nested blocks, i.e., a single consolidated unit, is limited up to 28 in the pdf format.

Referring to FIG. 5, a scope of the change graphics state command 2 framed by the q-operator and the Q-operator is a range between the end of the change graphics state command 2 and the Q-operator. Therefore, the above scope does not affect the draw graphics object command 3. Thus, using the q-operator and the Q-operator, the graphics can be changed tentatively without disturbing the graphics state. However, a lot of calculations are needed to implement this change.

FIG. 6 illustrates example images of file body, i.e., a description image, an object image and a drawing image when graphics are added to a pdf file. The example images illustrate a case when [$60_{obj}$] is added. Two implementation steps are needed to add the graphics object, i.e., a generation step that generates a command to draw the graphics object to be added, and an adding step that adds the generated command as a Contents item to [$30_{obj}$] that holds the page information.

During the implementation of the above processes, the following should be considered. The draw graphics object command may be affected by the change graphics state commands 1, 2 and 3 that are existed before the implementation. Therefore, it is necessary to remove the effect of the existing graphics state in some way in order to draw the added graphics object as the user intended.

Currently, the following process steps are generally performed. As a first process step, a draw graphics object command is analyzed and a current available graphic state is calculated. As a second process step, a change graphic state command that removes the effect of the current graphic state is inserted, before the implementation of the drawing graphics object command to be added based on the calculation result.

A method to treat a Pdf file, in which an existing graphic state is changed by changing an axis in the following two steps, is described in more detail. At the first step, an axis system is moved by 10 units in a x-axis direction and is shifted by 20 units parallel to a y-axis. At the second step, the axis system is rotated 30 degrees.

First, by analyzing the Contents-stream, the graphics state is confirmed, that is, whether the graphics is in a state in which the axis system is moved by 10 units in a x-axis direction, is shifted by 20 units parallel to a y-axis, and is rotated 30 degrees. Next, based on the result of the analysis, a command that returns the axis system to a default state is added to remove the effect of the existing graphics state. The added command causes the axis system to move by −10 units in a x-axis direction, the axis system to shift by −20 units parallel to a y-axis, and the axis system to rotate 30 degrees. As a result, the effect of the existing graphics state can be removed.

In another technology to solve the problem, when the header and footer are provided, portions in which header and footer are provided are checked in advance. A white image is provided only when an image is present at a position at which the footer is provided. Thus, the adding process is performed automatically to a non-intended image region.

In this technology, the region to which the header and footer is provided is examined to determine whether or not an image is present. After the entire information of the page of the pdf file is extracted, a specific region is checked. If an image is present in the specific region, a white image is provided. If an image is not present in the specific region, the header and footer are provided. Thus, the objects i.e., header and footer can be added to an intended page of the pdf file. However, the implementation requires a lot of calculation time.

SUMMARY OF THE INVENTION

A method and editing processor for adding graphics object with simple manner are described. In one embodiment, an editing processor, comprises a storage unit to store a document file that includes an object group in which objects are arranged according to an implementation order at each page of an electronic document; a reading unit to read the object group from the storage unit in response to a read request for a target page of the electronic document; an encapsulation processing unit to encapsulate a graphics object in the object group in response to input of information on the graphics to be added; and an editing unit to generate a graphics object from the information on the graphics and to add the generated graphics object to a position following the end of the object group arranged according to the implementation order in response to encapsulation of the graphics object.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 3A through 3C illustrate example images of the file body, i.e., a description image, a merged object image and a drawing image;

FIGS. 6A through 6C illustrate example images of file body, i.e., description image, merged object image and drawing image when graphics is added to a page of the pdf file;

FIGS. 9A through 9C illustrate example images of file body, i.e., a description image, a merged object image, and a drawing image when graphics is added to a page of the pdf file by the editing processor;

FIG. 10 illustrates a total flowchart of adding process of graphics;

FIG. 13 illustrates a flowchart of a process for adding graphics object.

DETAILED DESCRIPTION OF PREFERRED EMBODIMENTS

Figure 1:
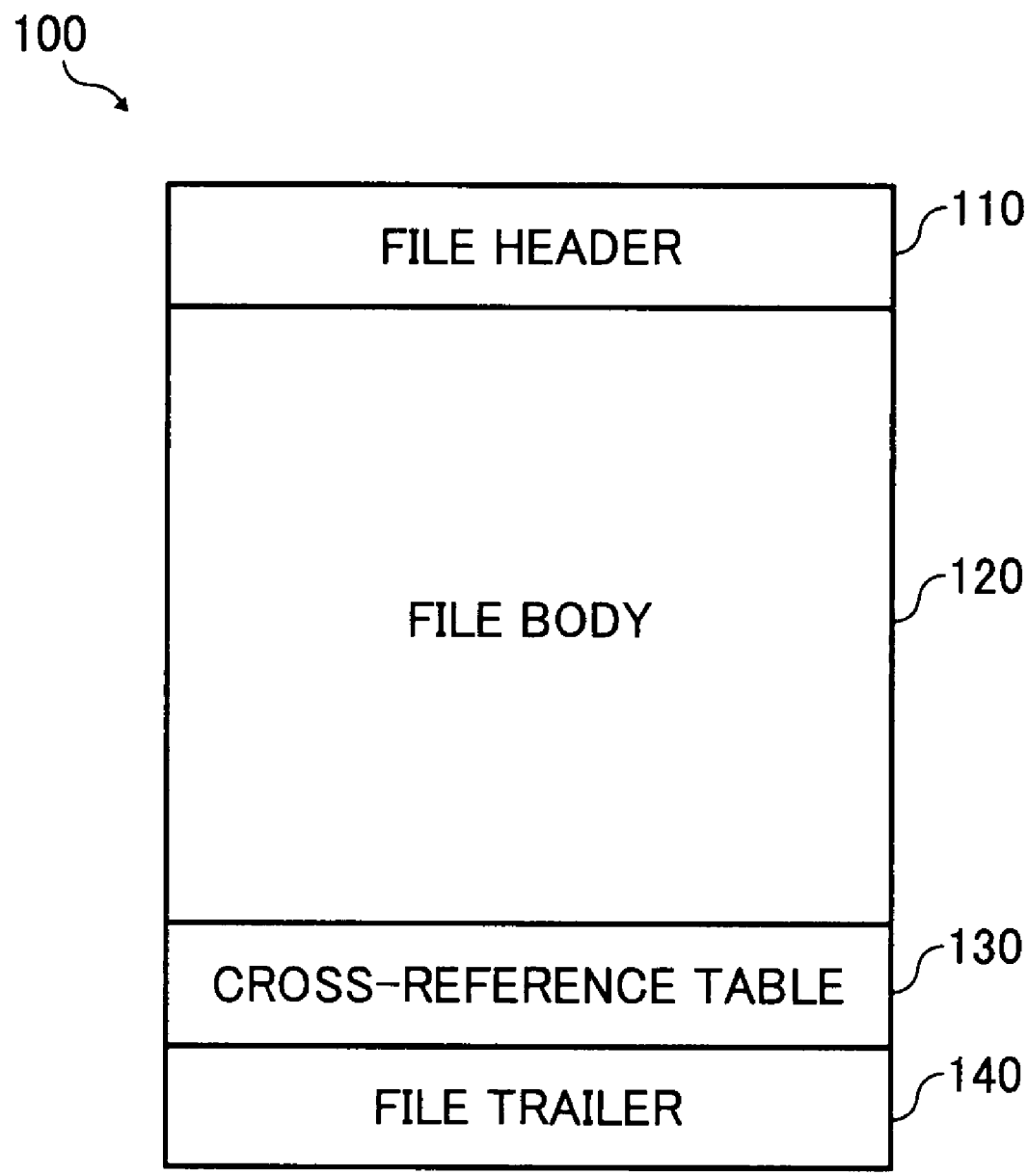
FIG. 1 illustrates a configuration of a pdf file.
Figure 2:
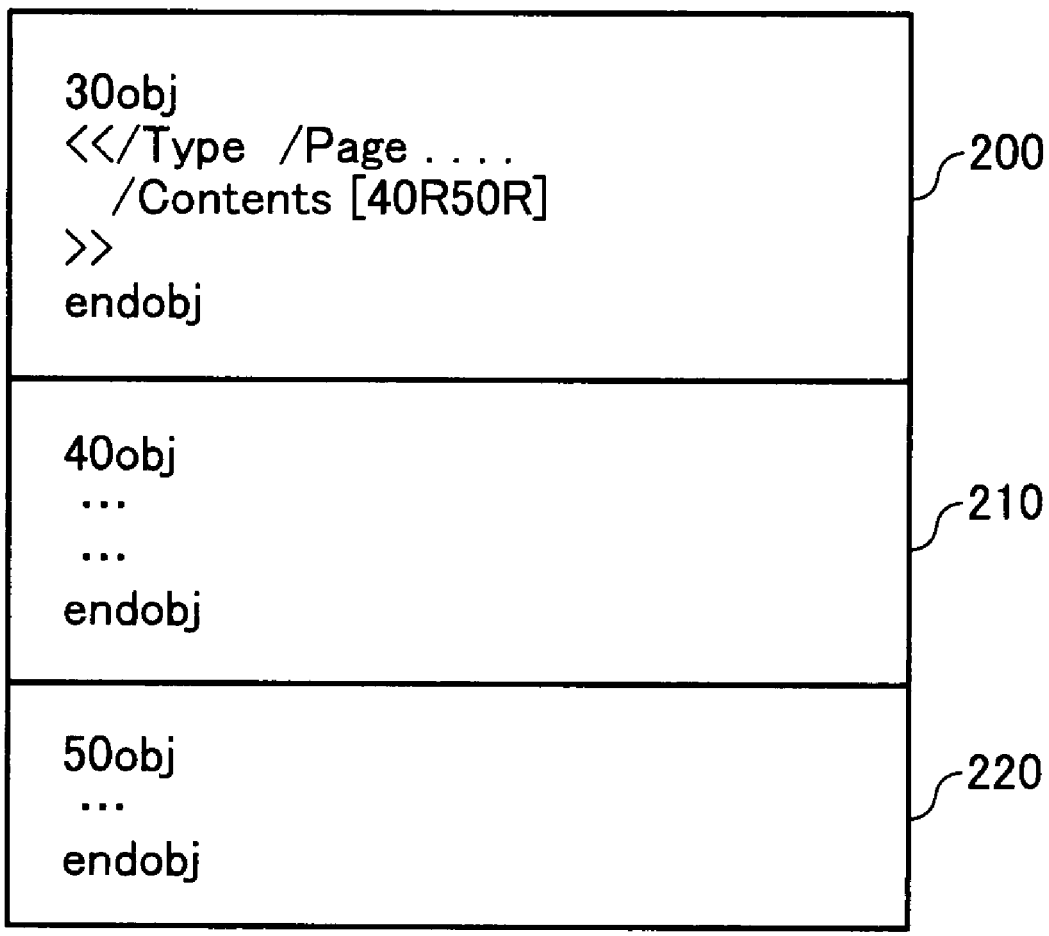
FIG. 2 illustrates a description image of a file body of the pdf file.
Figure 3C:
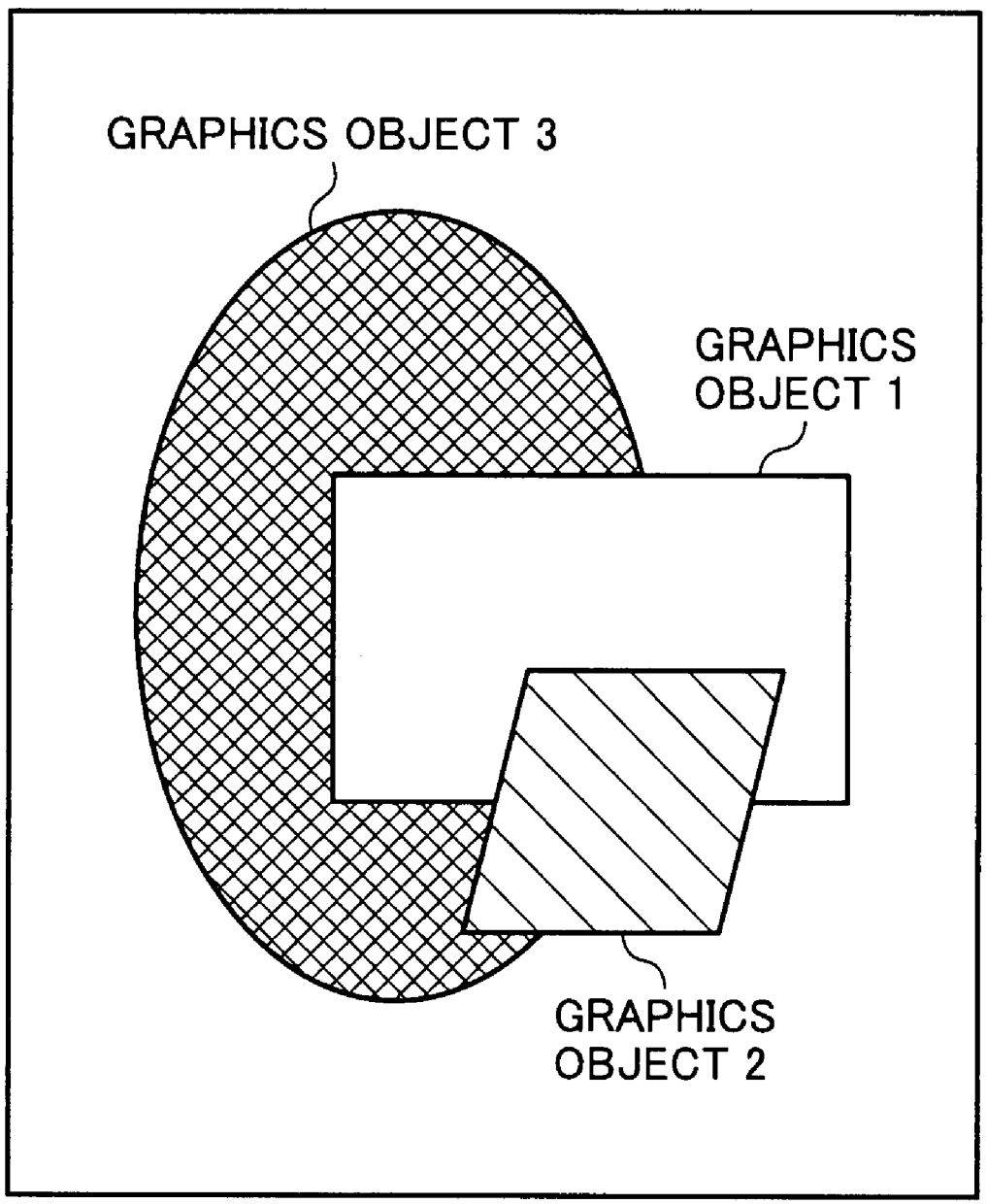
Figure 4:
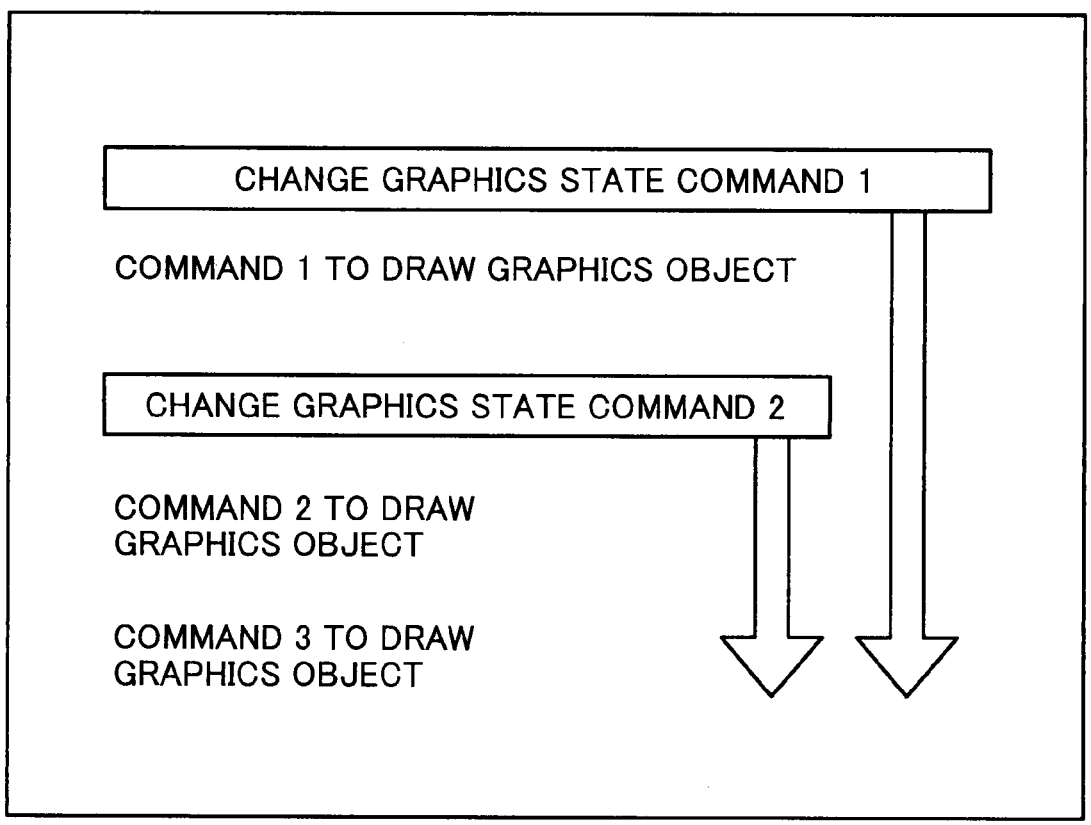
FIG. 4 illustrates a Content-stream.
Figure 5:
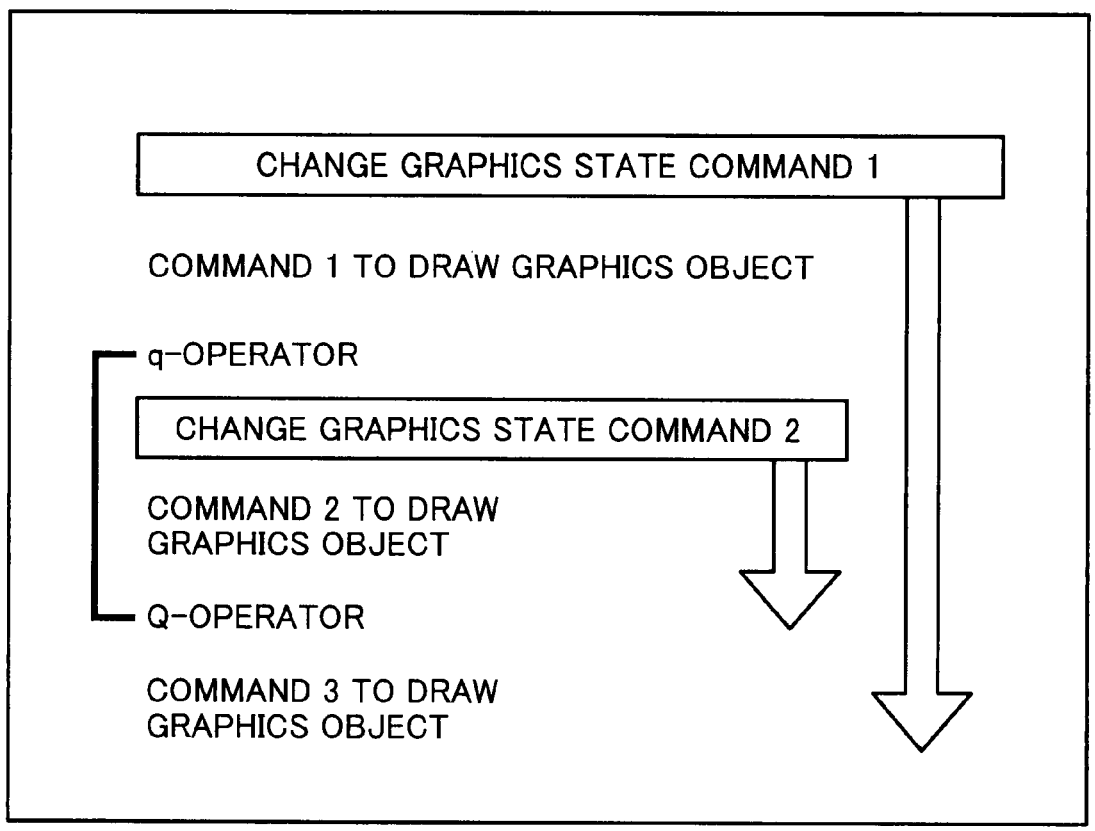
FIG. 5 illustrates a Content-stream using q-operator and Q-operator.
Figure 6C:
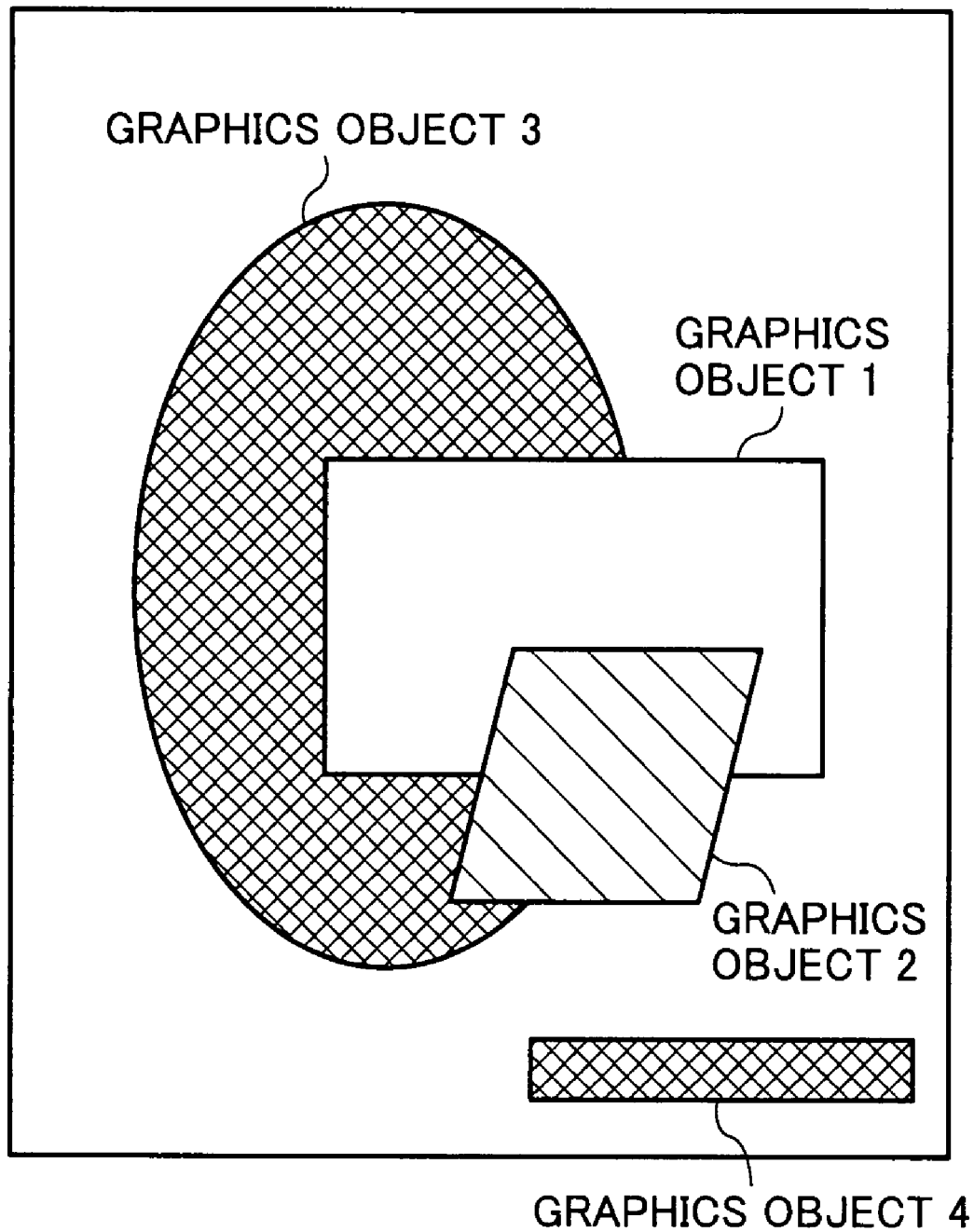

This patent specification describes a novel editing processor includes a storage unit to store a document file that includes object group in which objects are arranged according to an implementation order at each page of an electronic document, a reading unit to read the object group from the storage unit in response to a read request for a target page of the electronic document, an encapsulation processing unit to encapsulate an graphics object in the object group in response to an information input of the graphics to be added, and an editing unit to generate a graphics object from the information of the graphics and to add the generated graphics object to a position following the end of the object group arranged according to the implementation order in response to the encapsulation of the graphics object.

This patent specification further describes a novel computer readable medium that stores a computer program product for executing a method for controlling an editing processor when run on a data processing apparatus, the method comprising reading object group, in which objects are arranged according to an implementation order and define a target page, from a storage unit in response to a read request for a target page of a electronic document, encapsulating a predetermined graphics object in the object group in response to input of information on graphics to be added, and adding generated graphics object to a position following the end of the object group arranged according to the implementation order in response to encapsulation of the graphics object.

Further, this patent specification describes a novel method for controlling an editing processor which includes reading the object group, in which objects are arranged according to an implementation order and define a target page, from the storage unit in response to a read request for a target page of the electronic document, encapsulating a predetermined graphics object in the object group in response to an information input of the graphics to be added and adding the generated graphics object to a position following the end of the object group arranged according to the implementation order in response to the encapsulation of the graphics object.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Figure 7:
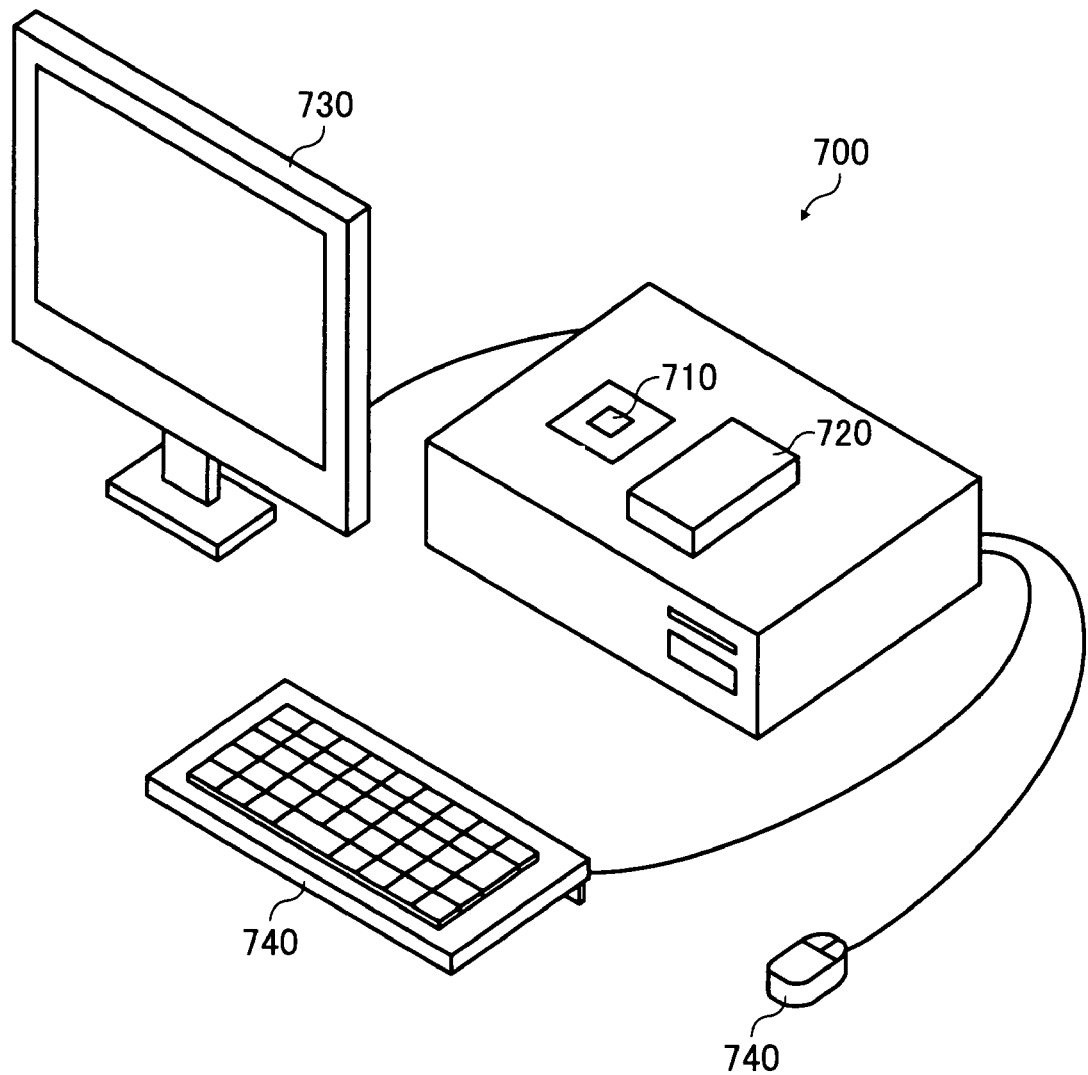
FIG. 7 illustrates an editing processor according to the present disclosure.
Figure 8:
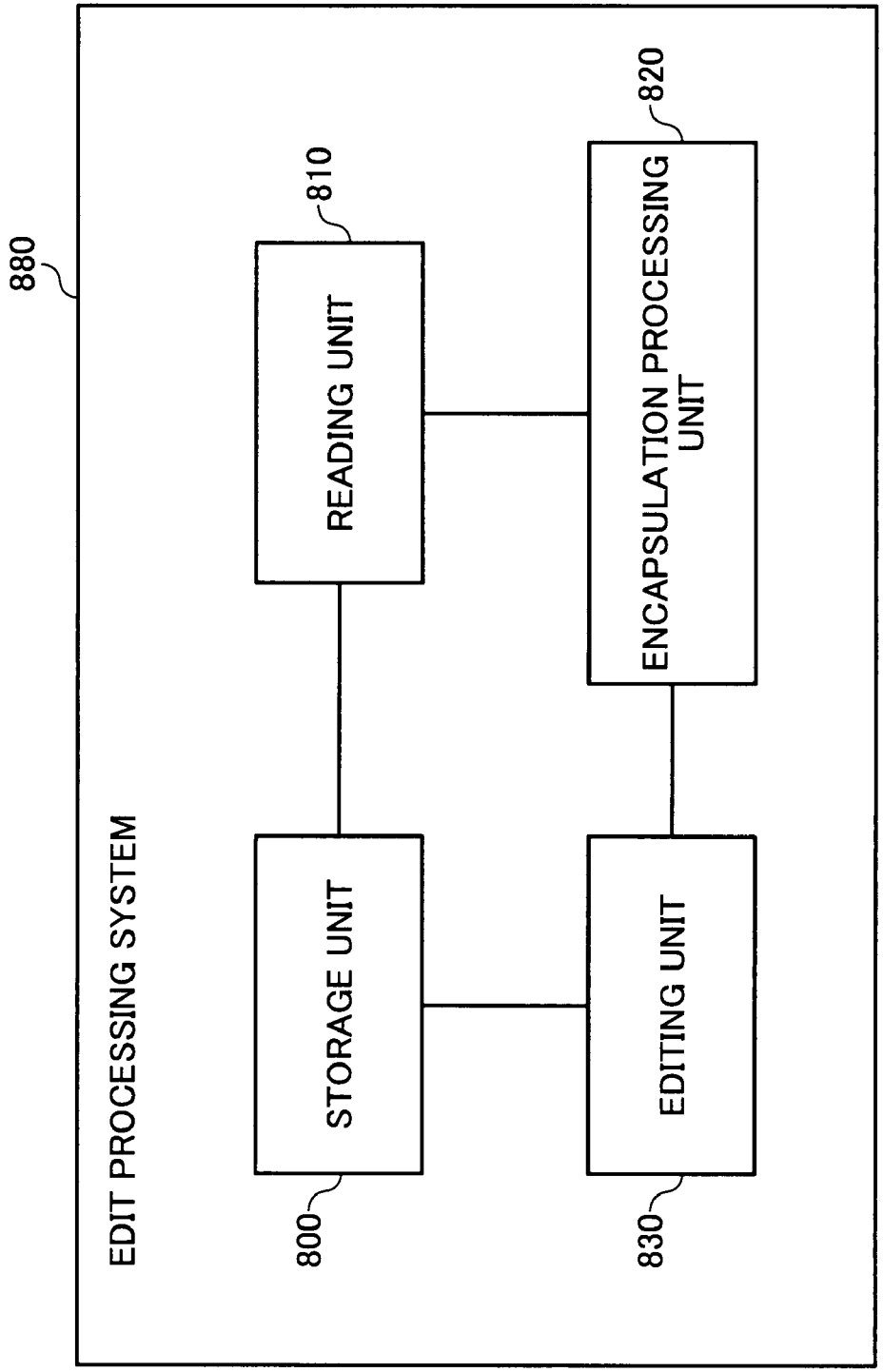
FIG. 8 illustrates a block configuration of example edit processing system.

Referring now to the drawings, wherein like reference numerals designate identical or corresponding parts throughout the several views, particularly to FIGS. 7 and 8, editing processors according to embodiments of the present invention are described.

FIG. 7 illustrates an embodiment of an editing processor according to one embodiment of the present invention. In FIG. 7, a personal computer is shown as the editing processor. The editing processor 700 includes a processor 710, a storage device 720, a display 730 and input devices 740. The processor 710 performs a variety of tasks. The storage device 720 stores an electronic document as a document file and a program that causes the processor 710 to perform the variety of tasks. The display 730 displays each page of the electronic document and a graphics object drawn at each page. The input devices 740 are keyboard, mouse, etc. to input a read request for the document file and object group, and information of graphics to be added.

The electronic document can be created to be a pdf file. For example, using a document creation application, user can create the electronic document by inputting characters and drawing figures with the input devices 740. The created electronic document is translated to a pdf file using a pdf translation application. The document creation application, the pdf translation application and the created pdf file are stored in the storage device 720.

The pdf file comprises at least one page and each page can includes graphics. When a graphic is added to an existing page that already includes graphics, information about the graphics to be added is input from the input device 740. The processor 710 implements the program for adding the graphics, encapsulates the existing graphics objects, generates a graphics object based on the input of information, and adds the generated graphics object to the existing graphics objects.

Document file that includes additional graphics object is store in the storage device 720. In this process, the document is overwritten and saved.

The document can be displayed on the display 730 using browsing software such as Viewer. The document displayed is a merged document with the existing graphics objects and the added graphics object.

The editing processor is not limited to the personal computer 700 as shown in FIG. 7, but can be any edit processing system 880 that includes a storage unit 800, a reading unit 810, an encapsulation processing unit 820 and an editing unit 830 as shown in FIG. 8. For example, a printer, a facsimile, a scanner and a multifunctional device combining the foregoing apparatuses can be the editing processor.

Referring to FIG. 8, a configuration of the edit processing system 880 is described in detail. The edit processing system 880 includes a storage unit 800, a reading unit 810, an encapsulation processing unit 820 and an editing unit 830. The storage unit 800 stores an electronic document such as pdf file as a document file. The storage unit 800 is the equivalent to the storage unit 720 in FIG. 7. Data in the file body of the electronic document is defined by object array. Each page of the electronic document is defined by object group arranged according to implementation order.

The object group can include a control object, a graphics object and other objects. The control object includes information relates to the implementation order of the object. The graphics object is designated by the control object. The object includes an identifier to identify the object, and can include command, data and etc.

The control object includes object identifiers arranged according to implementation order as Contents item data. The control object may include two and more than two object identifiers. The graphics object can include draw graphics object command and change graphics state command. The draw graphics object command can be a command written with the graphics operator. The change graphics state command is a command to change the graphics state and includes parameters of color setting information and axis-system information. Further, it is possible to be a command to change the color setting information and the axis-system information.

The reading unit 810 reads the object group that defines the target page of the document file from the storage unit 800 in response to a read request of the target page of the electronic document. The read request can be received in response to user's input. For example, in response to user's input such as clicking a document file name, the document file can be searched on the storage unit 800 based on the document file name and can be read. Thus, the document file is identified and is read. The object group that defines the page can be read based on the user's specification for the target page.

The encapsulation processing unit 820 encapsulates a predetermined graphics object in the object group in response to input of information with respect to the graphics to be added. The encapsulation process is described in detail. A pair of limiting objects are generated in order to limit an effective range in which the graphics state is changed and the graphics information is changed by the change graphics information command. Each object identifier of the limiting objects is inserted before and after object identifier of the graphics object to be limited arranged in Contents-item of the control object.

The limiting objects include first and second limiting objects. The first limiting object includes a q-operator which defines one end (front end) of the effective range to be changed by the change graphics information command. The second limiting object includes a Q-operator which defines other end (back end) of the effective range to be changed. These limiting objects are created by describing the q-operator and the Q-operator. In pdf document, the q-operator and the Q-operator are provided to localize the scope of the graphics state to be changed as described above.

As for the graphics state around the region framed by the q-operator and the Q-operator that corresponds to the q-operator, the graphics state of the region after the Q-operator becomes invalid and is returned to be a graphics state equal to the graphics state before the position of the q-operator. These q-operator and Q-operator can be consolidated in a nested block. (A plurality of commands can be wrapped up as a unity.)

The editing unit 830 generates graphics object from the graphics information in response to the encapsulation process. The generated graphics object is added to the end portion of the object group array arranged according to implementation order. As described, additional graphics object is generated by writing the graphics operator.

After adding the graphics object to the document file, the document file is saved and stored in the storage unit 800. The reading unit 810, the encapsulation processing unit 820, and the editing unit 830 read the program from the storage unit 800 to implement the aforementioned process. The editing processor implements in order to function on each unit.

The edit processing system 880 further includes a control object judgment unit, a nest number adjusting unit, a first nest number judgment unit, a first error process unit, a second nest number judgment unit, a second error process unit and an identifier insertion unit. Similarly, the processor implements in order to function on each unit.

The control object judgment unit checks whether or not the object group read by the reading unit 810 includes the first or second limiting objects of the limiting object pair. When the control object judgment unit judges that the first limiting object is included, the nest number adjusting unit increases the nest number by one. When the control object judgment unit judges that the second limiting object is included, the nest number adjusting unit decreases the nest number by one. "Nest" means that another routine or data block is embedded in the existing routine or data block. "Nest number" means a number of another routines or data blocks embedded. In this disclosure, the nest number is a number of the regions framed by q-operator and Q-operator.

The first nest-number-judgment unit checks whether or not the nest number is less than a predetermined limit number and a negative number. In a case of pdf file, the limit number is a number one less than the largest nest number 28, i.e., 27, based on the pdf file specification. It is necessary to add a q-operator to add an object. The reason of the subtraction by one in this case is to avoid an error occurrence when the nest number is increased by one.

Basically, if the object is framed by the q-operator and the Q-operator, the nest number is adjusted to zero because of cancellation. When the first nest-number-judgment unit determines that the nest number is larger than the predetermined limit number or a negative number, the first error process unit performs a predetermined processing by outputting error message, etc. The error message is displayed on the display 730. The adding process of graphics may be stopped in this error processing.

The second nest-number-judgment unit checks whether or not the nest number of the object group is zero or not. Similar to the case described above, if the object is properly framed by the q-operator and the Q-operator, the nest number is adjusted to zero. Similarly to the first error process unit, when the second nest-number-judgment unit determines that the nest number is not zero, the second error process unit performs a predetermined processing by outputting error message, etc.

In this embodiment, when the second nest-number-judgment unit determines that the nest number is not zero, the second nest-number-judgment unit works as the identifier insertion unit by generating a second limiting object in accordance with the nest number and inserting the object identifier of the second limiting object in order to form a pair of limiting objects with the object identifier of the first limiting object in the Contents.

Figure 9C:
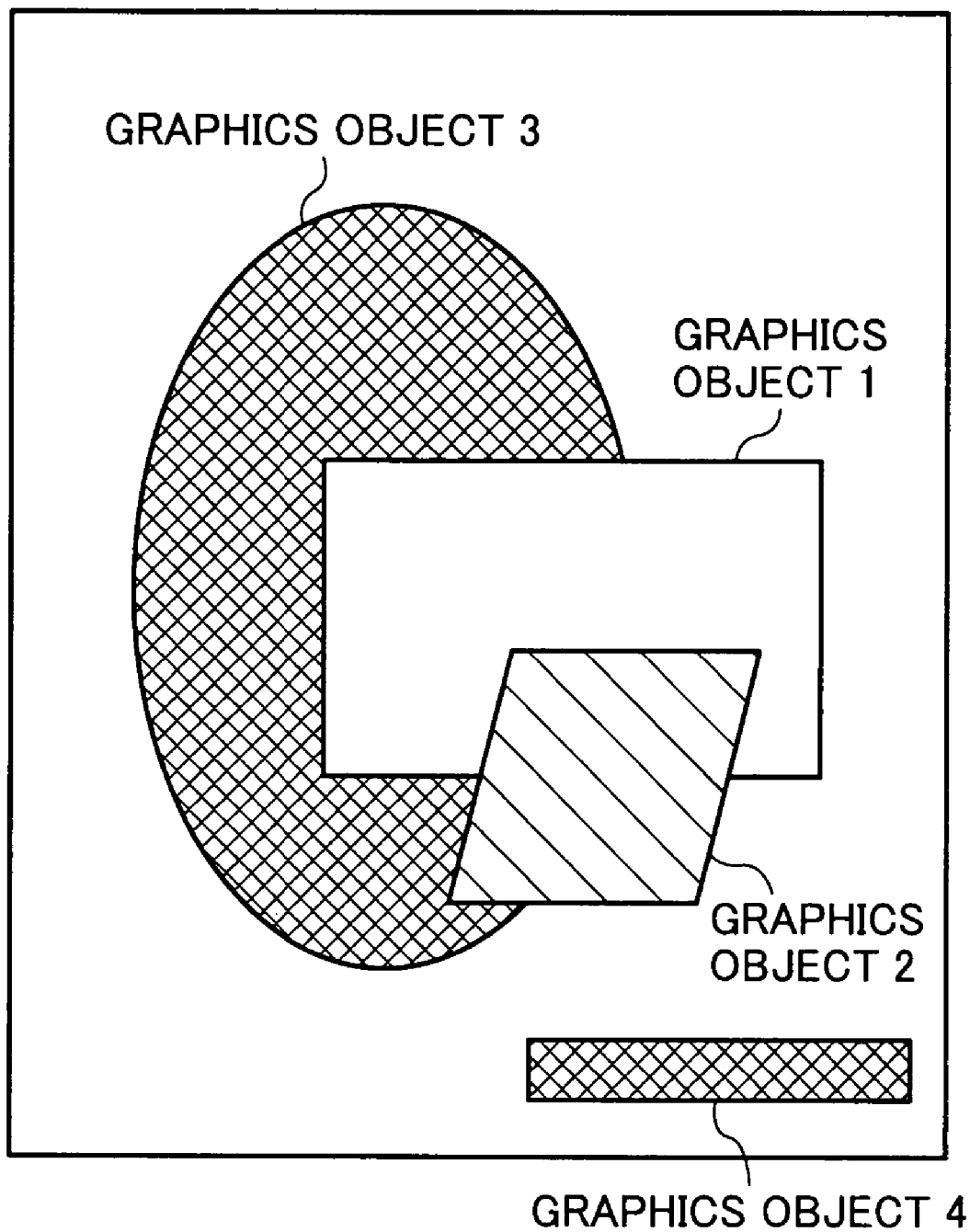

Referring to each image in FIGS. 9A through 9C, an adding process to add a graphics is described. Graphics objects at a target page are framed by the q-operator and the Q-operator. In this embodiment, the graphics objects are command lines $[40_{obj}]$ and $[50_{obj}]$ defined in Contents-streams and the q-operator and the Q-operator are defined by objects $[70_{obj}]$ and $[80_{obj}]$. By this configuration, it is possible to encapsulate the change of the graphics state in the existing Contents-streams.

A graphics object to be added is created by describing graphics operator continuously after Contents-stream. More specifically, the object $[60_{obj}]$ is added at a position after the object $[50_{obj}]$. The object $[60_{obj}]$ is added in a form of [60R] into the Contents item defined in $[30_{obj}]$ at a position after [80R] for the object $[80_{obj}]$ that includes Q-operator. The object identifier is [60] in this case. The objects are implemented in accordance with the Contents item of the control object $[30_{obj}]$. Namely, the objects are implemented successively in the order of $[70_{obj}]$, $[40_{obj}]$, $[50_{obj}]$, $[80_{obj}]$ and $[60_{obj}]$. In this case, $[70_{obj}]$, $[40_{obj}]$, $[50_{obj}]$, $[80_{obj}]$ and $[60_{obj}]$ are identified by [70], [40], [50], [80] and [60], respectively.

In the embodiment shown in FIGS. 9A through 9C, the graphics objects are drawn successively. In the region framed by q-operator and the Q-operator during the drawing process, the changing command 1 affects the graphics objects 1 through 3, the change command 2 affects the graphics objects 2 and 3, and the change command 3 affects the graphics object 3. Meanwhile, the draw command to draw a graphics object 4, that is other region than the region framed by q-operator and the Q-operator, is not affected by the change commands 1 through 3, but is affected only by the change command 4.

Thus, the command lines are encapsulated by being framed by q-operator and the Q-operator such that graphics object can be added without effect from the change commands located in the encapsulated region. The graphics is added in the target page by the addition of graphics object.

Referring to FIG. 10, controlling method for the edit processor to add a graphics is described. In response to a read request for editing a target pdf document, a document file of the pdf file to be edited is read from the storage 800 (S1010). In response to a page specification of the target page, object group of the page are read (S1020). The object group is formed of control object and a plurality of graphics objects as shown in FIGS. 9A through 9C. The nest relation and the nest number are checked whether or not the object that includes q-operation or Q-operation is included (S1030). This step will be explained later in detail. Receiving input of information on the graphics to be added (S1040). Based on the reception of the input of information on the graphics, encapsulation is performed, a graphics object is generated, and adding process is performed to add the graphics object (S1050). The processing ends after completion of the adding process of the graphics object.

Figure 11:
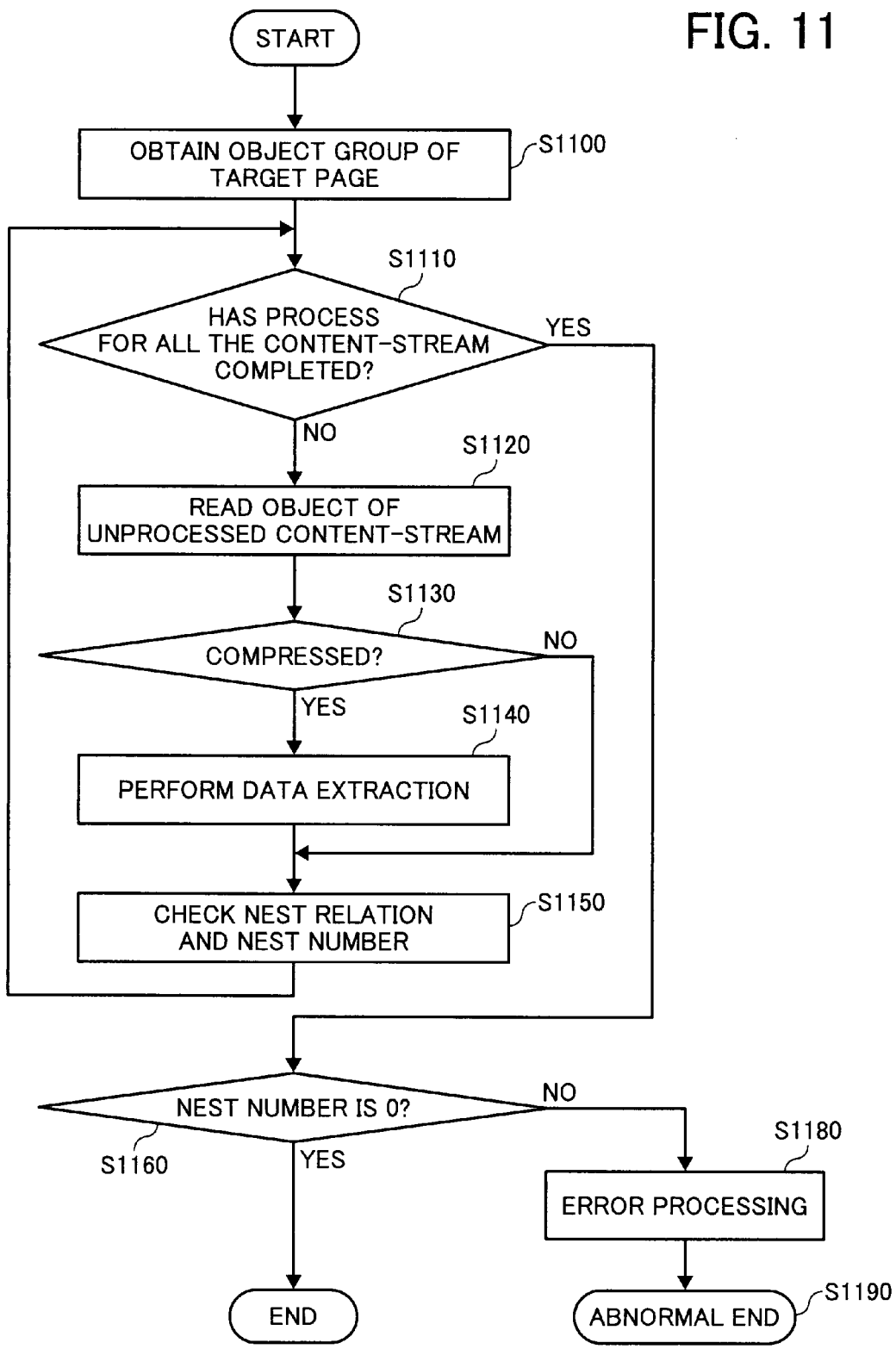
FIG. 11 illustrates a flowchart of a process for confirming a nest number according to a first example embodiment.
Figure 12:
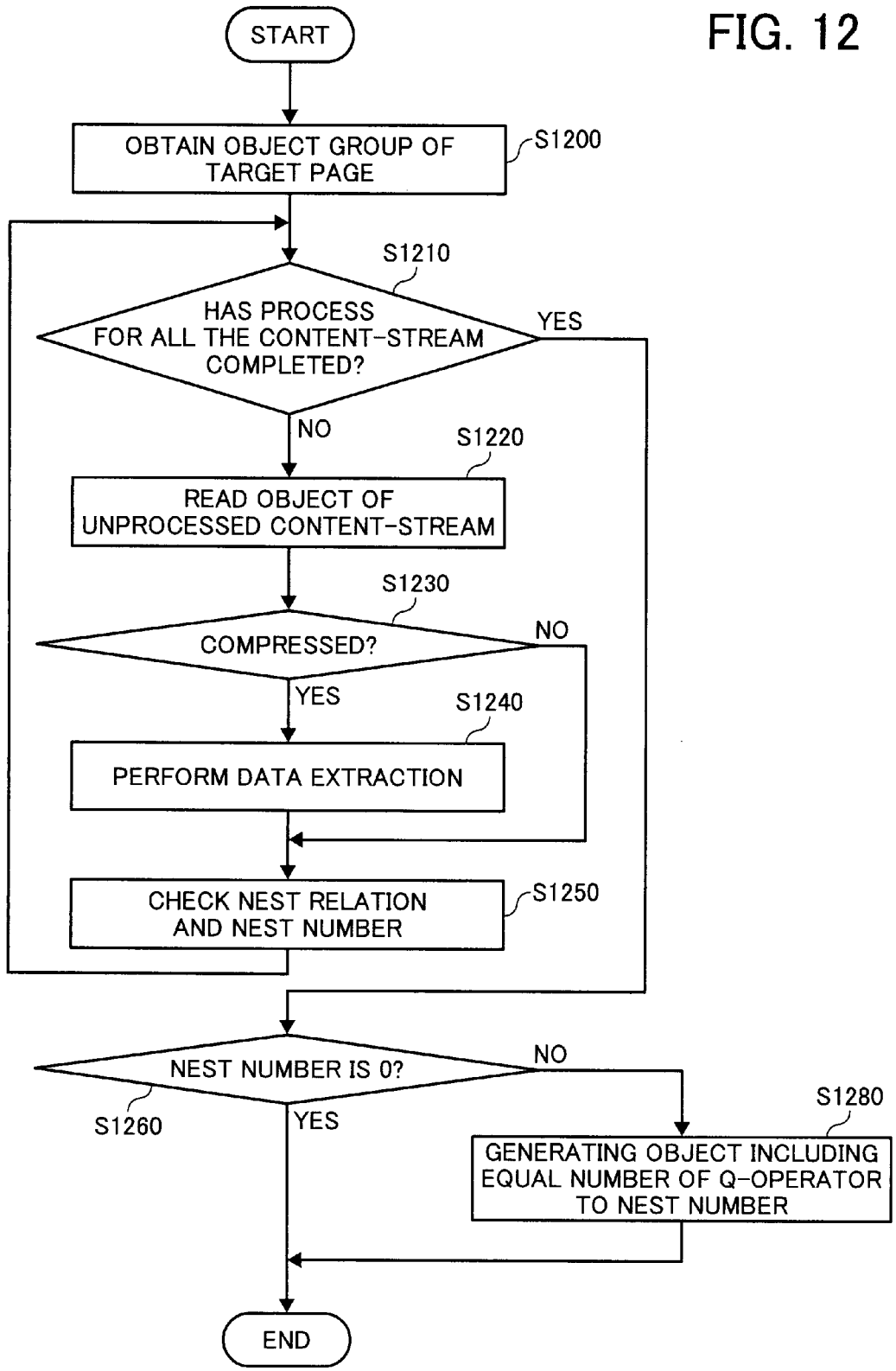
FIG. 12 illustrates a flowchart of process for confirming a nest number according to a second example embodiment.

Referring to FIGS. 11 and 12, the process step (S1030) is now described in detail. In FIG. 11, the process starts with reading and obtaining an object group of the target pdf document (S1100). The object group is read by the reading unit 810. The object group includes control object. The Contents item of the control object includes an object identifier to arrange commands in implementation order. Process loop is started with the implementation order.

It is checked whether or not confirmation process of the nest number has completed for all the Contents stream (object) (S1110). If the confirmation process has not completed for all the Contents stream, an object corresponding to the object identifier having the higher priority with respect to implementation order is selected (S1120). The process is performed successively. The selected object is checked whether or not the object is compressed (S1130). If the object is compressed, the object is extracted (S1140). A nest relation and the nest number are checked on the object extracted at the step (S1140) and on the object determined to be uncompressed at the step (S1130) (S1150).

The objects are checked whether or not the q-operator is included. If the q-operator is included, the nest number is increased by one. Next, the nest number is checked whether or not the nest number is larger than the limit number 27. The limit number 27 is the nest number based on the pdf file specification. (largest nest number "28"-"1")

When the nest number is larger than the limit number 27, an error process is performed because the nest relation is abnormal. An error message can be sent, or the process can be stopped because of an error occurrence.

The objects are checked whether or not the Q-operator is included. If the Q-operator is included, the nest number is decreased by one. If the q-operator is included, the Q-operator is not included. The q-operator and the Q-operator have been introduced generally if the object was added. Next, the nest number is checked whether or not the nest number is a negative number. When the nest number is a negative number, an error process is performed because the nest relation is abnormal. Similarly, an error process is performed.

Thus, the objects are drawn in implementation order, and the nest relation and the nest number are checked. Generally, the q-operator and the Q-operator are used together as a pair. Therefore, the nest number is zero. When the object having the q-operator is drawn and is checked, the nest number is increased by one. Then, after the object having the Q-operator is drawn and is checked, the nest number is decreased by one and becomes zero.

After the checking has completed for all the objects, the processing proceeds to the step S1160. It is checked whether or not the final nest number is zero. If a Q-operator is added to make a pair with a q-operator, the nest number is zero without fail. However, if the object is not closed accidentally without adding Q-operator, the nest number is not zero, but some number. Therefore, the nest number should be checked whether or not the nest number is zero.

When the nest number is zero, the nest number confirming process ends because the nest relation is normal. When the nest number is not zero, the processing proceeds to the step S1180 and an error process is performed because the nest relation is abnormal. After the error process, the processing proceeds to the step S1190 and ends as an abnormal processing.

In FIG. 12, the process starts with reading and obtaining object group of a target pdf document (S1200) similarly to the process shown in FIG. 11. The loop is started with the implementation order. It is checked whether or not confirmation process of the nest number has completed for all the Contents stream (object) (S1210). If the confirmation process has not completed for all the Contents stream, an object corresponding to the object identifier having the higher priority in implementation order is picked (S1220). This process is performed successively. The picked object is checked whether or not the object is compressed (S1230). If the object is compressed, the object is extracted (S1240). When the object is the extracted object at the step (S1240), or the object determined to be uncompressed at the step (S1230), the nest relation and the nest number are checked (S1250).

The nest number is checked in the similar way as previously described. After the checking has completed for all the objects, the processing proceeds to the step S1260. The final nest number is checked whether or not the final nest number is zero. If a Q-operator is added to make a pair with a q-operator, the nest number is zero without fail. However, if the object is not closed accidentally without adding Q-operator, the nest number is not zero, but some number. Therefore, the nest number should be checked whether or not the nest number is zero.

When the nest number is zero, the processing ends the nest number confirming process because the nest relation is normal. When the nest number is not zero, the processing proceeds to the step S1280 and an object having a necessary number of the Q-operator is generated and inserted in order to make a pair with the q-operator. After the insertion process, the nest number confirming process ends. The embodiment shown in FIG. 12 is processing performed when the nest number is a positive number, i.e., a number of the q-operator is larger than a number of the Q-operator.

Referring to FIG. 13, the process step S1050 shown in FIG. 10 is described in detail. In the object shown in FIG. 9A, information of the Contents item of the control object [30obj] is obtained at first (S1300). In case of FIGS. 9A through 9C, the information is [40R50R] at a timing before addition of the object. This information means that the objects [$40_{obj}$] and [$50_{obj}$] are implemented successively.

To add the object, an object having a q-operator is generated (S1310). Namely, in FIG. 9, it is [$70_{obj}$]. Next, object identifier [70] is added in the form of [70R] at the top of the Contents item of the control object (S1320). As a result, the information becomes [70R40R50R]. The objects [$70_{obj}$], [$40_{obj}$] and [$50_{obj}$] are implemented successively in the implementation order.

An object having Q-operator and being provided to the corresponding q-operator is generated (S1330). In FIG. 9A, it is [$80_{obj}$]. Next, object identifier [80] is added in the form of [80R] at the end portion of the Contents item of the control object (S1340). As a result, the information becomes [70R40R50R80R].

For every object to be added, confirmation loop is performed. It is checked whether or not all the adding object process has completed (S1350). If there still be an object, a graphics object to be added is generated first (S1360). The object includes a drawing graphics object command. The object also includes an object identifier. Next, object identifier is added at the last portion of the Contents item of the control object (S1370). In FIG. 9A, object identifier [60] is added in a form of [60R] and the information becomes [70R40R50R80R60R].

If there are still objects to be added, the processing steps S1350 through S1370 are repeated. When all the objects scheduled to be added have been processed, the adding process ends. Thus, [$40_{obj}$] and [$50_{obj}$] are framed by the q-operator and the Q-operator in order to be encapsulated. As a result, [$60_{obj}$] is not affected by the change command 1 through 3 that are included in existing [$40_{obj}$] and [$50_{obj}$].

Further, the object having the q-operator and the object having the Q-operator are simply inserted and the object to be added is added at the last portion of the Contents item of the control object, as described. Therefore, the calculation time can be reduced significantly according to the example embodiment.

The processes shown in FIGS. 10 through 13 can be realized by a combination of hardware units and can be provided by program file to be implemented by the processor 710. The program file is provided on a computer readable medium. The computer readable mediums are, for example, hard disc, flexible disc, CD-ROM (compact disc read only memory), CD-RW (Compact Disc-ReWritable), DVD-ROM (Digital Versatile Disc-Read Only Memory), DVD-RAM (Digital Versatile Disc-Random Access Memory), DVD-RW (Digital Versatile Disc-ReWritable), memory card, etc.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

What is claimed is:

1. An editing processor, comprising:
   a storage unit to store a document file that includes an object group in which objects are arranged according to an implementation order at each page of an electronic document; wherein the object group comprises a control object that includes information that relates to the implementation order of the objects and a graphics object specified by the control object, wherein an object includes an object identifier, and the control object includes object identifiers that are arranged according to the implementation order as contents item data, wherein the graphics object comprises a draw graphics object command and a change graphics information command;
   a reading unit to read the object group from the storage unit in response to a read request for a target page of the electronic document;
   an encapsulation processing unit configured to encapsulate a graphics object in the object group in response to input of information on the graphics to be added, wherein the encapsulation processing unit encapsulates the graphics object by generating a pair of limiting objects that limit an effective area to be changed by the change graphics information command, and by inserting each object identifier of the limiting objects at positions before and after the object identifier of the graphics object to be limited arranged in a contents item of the control object; and
   an editing unit to generate a graphics object from the information on the graphics and to add the generated graphics object to a position following the end of the object group arranged according to the implementation order in response to encapsulation of the graphics object.

2. The editing processor of claim 1, further comprising:
   a limiting object judgment unit to determine whether or not a first limiting object or a second limiting object is included in the object group read by the reading unit;
   a nest number adjusting unit to increase a nest number by one when the first limiting object is included, and to decrease the nest number by one when the second limiting object is included;
   a first nest number judgment unit to determine whether or not the nest number is smaller than a predetermined limit number or the nest number is a negative number; and
   a first error processing unit to transmit an error message when the nest number exceeds the predetermined limit number or the nest number is a negative number.

3. The editing processor of claim 1, further comprising:
   a second nest number judgment unit to determine whether or not the nest number of the object group is zero; and
   a second error processing unit to transmit an error message when the nest number is not zero.

4. The editing processor of claim 1, further comprising:
   a second nest number judgment unit to determine whether or not the nest number of the object group is zero; and
   an identifier insertion unit to generate a second limiting object and to insert an object identifier of the second limiting object in order to form a pair of the limiting objects with the first limiting object when the nest number is not zero.

5. A method for controlling an editing processor, comprising:
   reading an object group, in which objects are arranged according to an implementation order and define a target page, from the storage unit in response to a read request for a target page of an electronic document, wherein the object group comprises a control object that includes information that relates to the implementation order of the objects and a graphics object specified by the control object, wherein the graphics object comprises a draw graphics object command and a change graphics information command, wherein the object includes an object identifier, and the control object includes the object identifiers that are arranged according to the implementation order as contents item data;
   encapsulating a predetermined graphics object in the object group in response to input of information on the graphics to be added, wherein the encapsulating comprises
      generating a pair of limiting objects that limit an effective area to be changed by the change graphics information command; and
      inserting each object identifier of the limiting objects at positions before and after the object identifier of the graphics object to be limited arranged in a contents item of the control object; and
   adding the generated graphics object to a position following the end of the object group arranged according to the implementation order in response to encapsulation of the graphics object.

6. The method of claim 5, further comprising:
   determining whether or not a first limiting object or a second limiting object is included in the object group read by the reading unit;
   increasing a nest number by one when the first limiting object is included;
   decreasing the nest number by one when the second limiting object is included;
   determining whether or not the nest number is smaller than a predetermined limit number or the nest number is a negative number; and
   sending an error message when the nest number exceeds the predetermined limit number or the nest number is a negative number.

7. The method of claim 5, further comprising:
determining whether or not the nest number of the object group is zero; and
transmitting an error message when the nest number is not zero.

8. The method of claim 5, further comprising:
determining whether or not the nest number of the object group is zero; and
generating a second limiting object and inserting an object identifier of the second limiting object in order to form a pair of the limiting objects with the first limiting object when the nest number is not zero.

* * * * *